United States Patent

[11] 3,634,624

[72] Inventor Roger C. Glidden
12 Pleasant, Wenham, Mass. 01984

[21] Appl. No. 845,236
[22] Filed July 28, 1969
[45] Patented Jan. 11, 1971

[54] CARD FILE ADDRESS LOCATOR AND CODE CHECKER
16 Claims, 8 Drawing Figs.

[52] U.S. Cl. .......... 179/2 DP, 179/5
[51] Int. Cl. .......... H04m 11/06
[50] Field of Search .......... 179/5, 2 R, 2 DP, 2, 2.5, 84 VF; 340/149, 150, 157, 163, 171, 164; 317/151; 307/40

[56] References Cited
UNITED STATES PATENTS

| | | | |
|---|---|---|---|
| 3,458,657 | 7/1969 | Lester et al. | 179/2.5 |
| 3,396,370 | 8/1968 | Agnew | 340/163 |
| 3,390,234 | 6/1968 | Glidden | 179/5 |
| 3,308,239 | 3/1967 | Waldman et al. | 179/2 |
| 3,123,805 | 3/1964 | Derr et al. | 179/2 |
| 3,122,723 | 2/1964 | Coley et al. | 340/163 |
| 2,623,939 | 12/1952 | Derr | 340/163 |

*Primary Examiner*—Kathleen H. Claffy
*Assistant Examiner*—Tom D'Amico
*Attorneys*—Clarence A. O'Brien and Harvey B. Jacobson

ABSTRACT: A train of signal pulses are transmitted from telephone message lines through two signal frequency channels at a receiving station for decoding and selection of one of a plurality of solenoid-operated card ejectors during an initial signal transmission interval. Reception of the same signal pulse train a second time supplies an energizing pulse to the selected ejector. Energy to operate the selected ejector is obtained from the message lines and is stored during the initial signal transmission interval.

Roger C. Glidden
INVENTOR.

BY Clarence A. O'Brien and Harvey B. Jacobson
Attorneys

Roger C. Glidden
INVENTOR

BY Clarence A. O'Brien
and Harvey B. Jacobson
Attorneys

Roger C. Glidden
INVENTOR.

BY Clarence A. O'Brien
and Harvey B. Jacobson
Attorneys

CARD FILE ADDRESS LOCATOR AND CODE CHECKER

This invention relates to the decoding and readout of coded signal pulse trains in a communication system.

A communication system such as disclosed in my prior U.S. Pat. No. 3,390,234, involves the transmission of coded signals in the form of electrical pulses from a transmitting or reporting station to a receiving station through a telephone exchange system. In systems of this type, the receiving station may be, for example, a firehouse to which fires or other emergency conditions are reported. In the past reports have been punched in pulse code form on tape. The coded message readout in this manner, identified the reporting location when decoded by personnel at the receiving station. However, decoding has been slow particularly where a relatively large number of transmitting stations report to a particular receiving station. Automatic decoding and readout mechanism which would print out the information is generally expensive, requires constant maintenance and replacement of material such as paper and tape and also consumes a considerable amount of power for operation.

It is therefore an important object of the present invention to provide a decoding and readout mechanism associated with the signal-receiving apparatus at a receiving station to which coded pulse trains may be transmitted from a plurality of reporting stations and wherein rapid and reliable decoding is achieved as well as readout with a minimum and momentary consumption of electrical power. Thus, power for operating the apparatus of the present invention may be obtained from the telephone message lines themselves. Also, replacement of materials such as printout paper and tape is avoided.

In one particular embodiment of the present invention, readout is achieved by ejection of a selected filecard containing the address or location of the reporting station from which a coded signal is received, the coded signal being repeated before readout occurs in order to check its accuracy.

It will become apparent that the apparatus of the present invention to function properly must be associated with reporting stations having transmitters which meet certain requirements. The transmitters must dispatch pulse signals at two different frequencies during a predetermined signal transmission interval, the coded pulse train being repeated during a second signal transmission interval. Transmitters capable of dispatching such signals are disclosed for example in my prior U.S. Pat. No. 3,390,234 aforementioned or in any such transmitter wherein recycling occurs so that the coded pulse train will be repeated. If the repeated code signal is not identical to the initial signal or the transmission frequencies are not proper, operation of the apparatus will abort in which case the transmitter will recycle until a proper transmission code sequence occurs. Thus, in accordance with the present invention, when successful readout occurs, a return signal is dispatched to the transmitter to stop recycling. The transmitter disclosed in my prior U.S. Pat. No. 3,390,234 aforementioned features a return signal arrangement for stopping recycling, which involves the transmission of a continuous signal from the transmitter to the receiver. In accordance with the present invention however, no such continuous signal from the transmitter is required for this purpose. Instead, the apparatus of the present invention employs a current-sensing device which detects energization of a selected solenoid card ejector to cause operation of an oscillator generating a return signal at the receiving station designed to stop recycling of the transmitter at the reporting station.

Also in accordance with the present invention, the incoming signal from a reporting station is conducted through a pair of frequency discriminating channels which respectively conduct different portions of the coded pulse train to a pair of decoding circuits through which the signal pulses select one of a plurality of solenoids which operate the card ejectors in order to eject a selected card containing information as to the location of the reporting station from which the coded signal is received. Reception of pulses in one of the decoding circuits initiates a timing cycle through a delay circuit in order to generate a drive pulse at the end of the initial signal transmission interval. The drive pulse is operative through both of the decoding circuits to make a selection of one of the solenoids corresponding to the received code signal. Also at the end of the initial transmission interval, the decoding circuits are reset in preparation for reception of the repeated coded pulse train during a second signal transmission interval. At the end of the second signal transmission interval, stored energy is discharged through the selected solenoid to effect operation thereof. Operation of the selected solenoid is sensed by means of a current-sensing relay as aforementioned to cause operation of an oscillator generating the aforementioned return signal. At the end of the second signal transmission interval, the decoding circuits are again reset and a drive pulse of reversed polarity is generated to complete an energizing circuit through the selected solenoid and cause discharge therethrough of energy stored at the end of the first signal transmission interval. The entire signal transmission sequence is then terminated by disconnection of power from all components to finally reset the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 4, 5, 8:
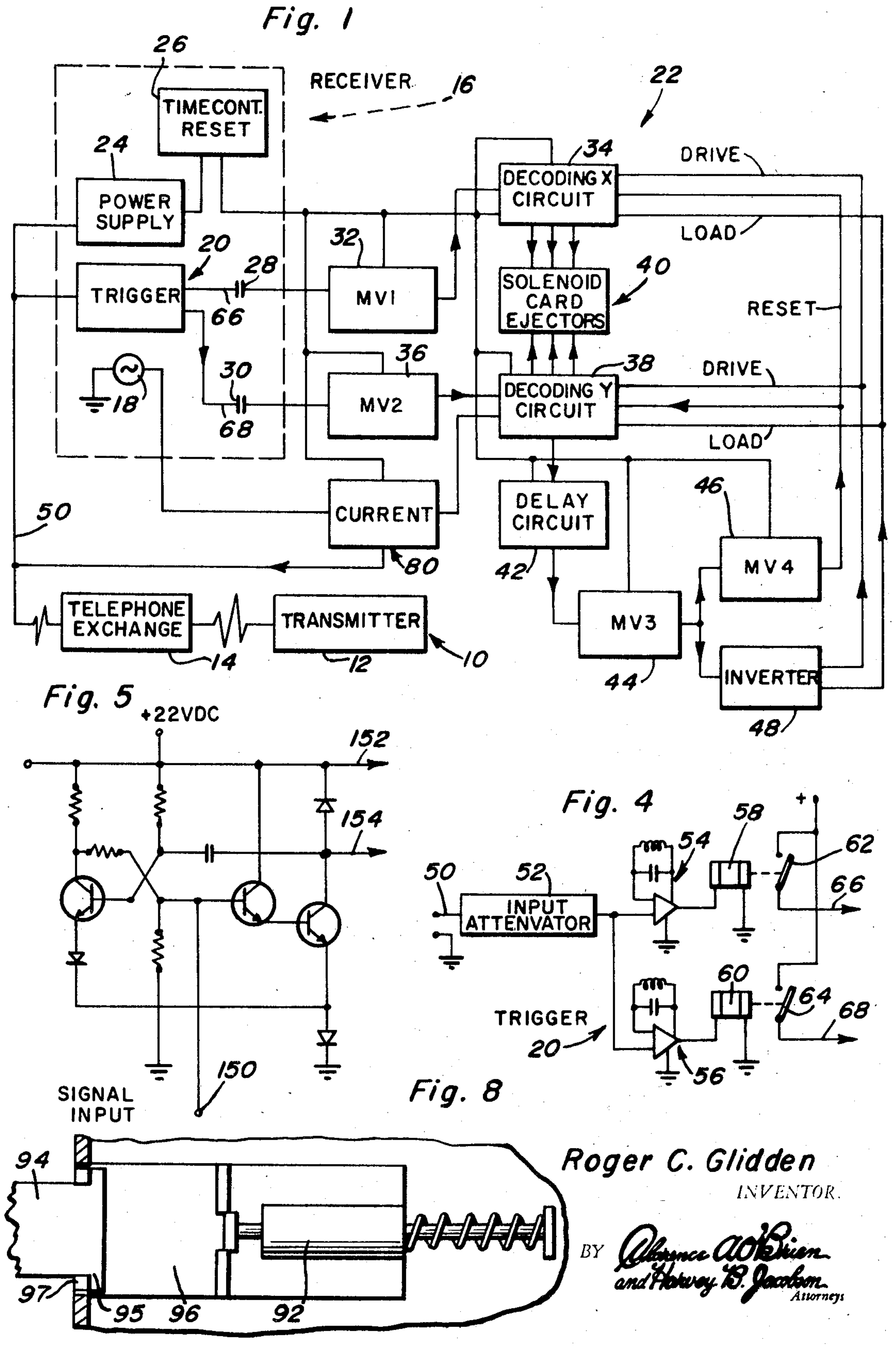
FIG. 1 is a schematic block diagram illustrating the system of the present invention.
FIG. 4 is an electrical circuit diagram illustrating one of the components of the system shown in FIG. 1.
FIG. 5 is a circuit diagram of the multivibrator components utilized in the system of the present invention.
FIG. 8 is a partial sectional view taken substantially through a plane indicated by section line 8—8 in FIG. 7.

Referring now to the drawings in detail, FIG. 1 schematically illustrates the present invention associated with an existing communication system generally denoted by reference numeral 10. By way of example, a transmitter component 12 at one of a plurality of reporting stations is connected through an existing telephone exchange 14 to a receiver 16. The receiver is connected through the telephone system to the transmitter 12 by automatic dialing means included therein as disclosed for example in my prior U.S. Pat. No. 3,390,234 aforementioned. After the communication connection is established, the transmitter dispatches a coded pulse train to the receiver 16. Portions of the pulse train are transmitted at different frequencies. This coded message is repeated by automatic recycling of the transmitter until such time as a return signal stops recycling. The return signal is generated by an oscillator 18 in the receiver.

The coded signal transmitted to the receiver is conditioned by a trigger component 20 in the receiver and applied to the decoding and readout device of the present invention generally referred to by reference numeral 22. Except for the trigger component 20 and the operational mode associated with the return signal oscillator 18, the receiver 16 may be similar to the receiving apparatus disclosed in my prior U.S. Pat. No. 3,390,234 aforementioned. Thus, the receiver 16 also includes a power supply component 24 through which the electrical energy in the telephone lines is converted into suitable form for use by the components of the receiving apparatus during a message-receiving period determined by a time constant reset mechanism 26 associated with the receiver.

With continued reference to FIG. 1, it will be noted that the incoming signal to the receiver after being conditioned by the trigger 20 is fed through signal-coupling capacitors 28 and 30 to two different frequency channels associated with the apparatus 22. The first signal channel comprises an astable multivibrator 32 through which the signal pulses are converted into drive pulses fed to a decoding circuit 34. The second signal channel includes a multivibrator 36 of the same type from which signal pulses are converted into drive pulses fed to a second decoding circuit 38. The multivibrators and decoding circuits are rendered operative during the message-receiving period by power supplied thereto from the receiver in order to condition the signal pulses and decode them by selecting one of a plurality of solenoids associated with an array of solenoid card ejectors generally referred to by reference numeral 40 to which the decoding circuits are connected.

A coded pulse train is received during an initial signal transmission interval the duration of which is determined by a delay circuit 42 connected to the second decoding circuit 38. Thus, in response to reception of the incoming signal to the decoding circuit 38, a timing cycle is initiated through the delay circuit in order to determine the signal transmission interval. At the end of this interval, the delay circuit is operative to trigger a third multivibrator 44 from which a drive pulse is fed to both of the decoding circuits in order to effect selection of one of the ejector solenoids. Following the drive pulse, a fourth multivibrator component 46 is triggered to generate a reset pulse that is fed to both of the decoding circuits in order to reset them in preparation for receipt of a repeated code pulse train during a second signal transmission interval. At the end of the second signal transmission interval, the inverter component 48 reverses the polarity of the drive pulse thereby conditioning the decoding circuits for energization of the selected ejector solenoid. Energy for operating the selected ejector solenoid, is obtained from stored energy supplied to the decoding circuits from a load storage line.

FIG. 4 illustrates the trigger component 20 associated with the receiver through which the input signal from the telephone lines 50 is split into two channels. The telephone line 50 is accordingly connected by an input attenuator 52 to the input side of a pair of band-pass amplifier networks 54 and 56. Thus, signal pulses of different frequencies may be separated by the band-pass amplifiers 54 and 56. The output of each amplifier is sufficient to pulse a corresponding relay coil 58 and 60 through which normally opened relay switches 62 and 64 are momentarily closed in order to develop DC signal pulses in the signal lines 66 and 68 from a 22-volt DC source made available by the receiver during the message reception period as aforementioned.

Figure 2:
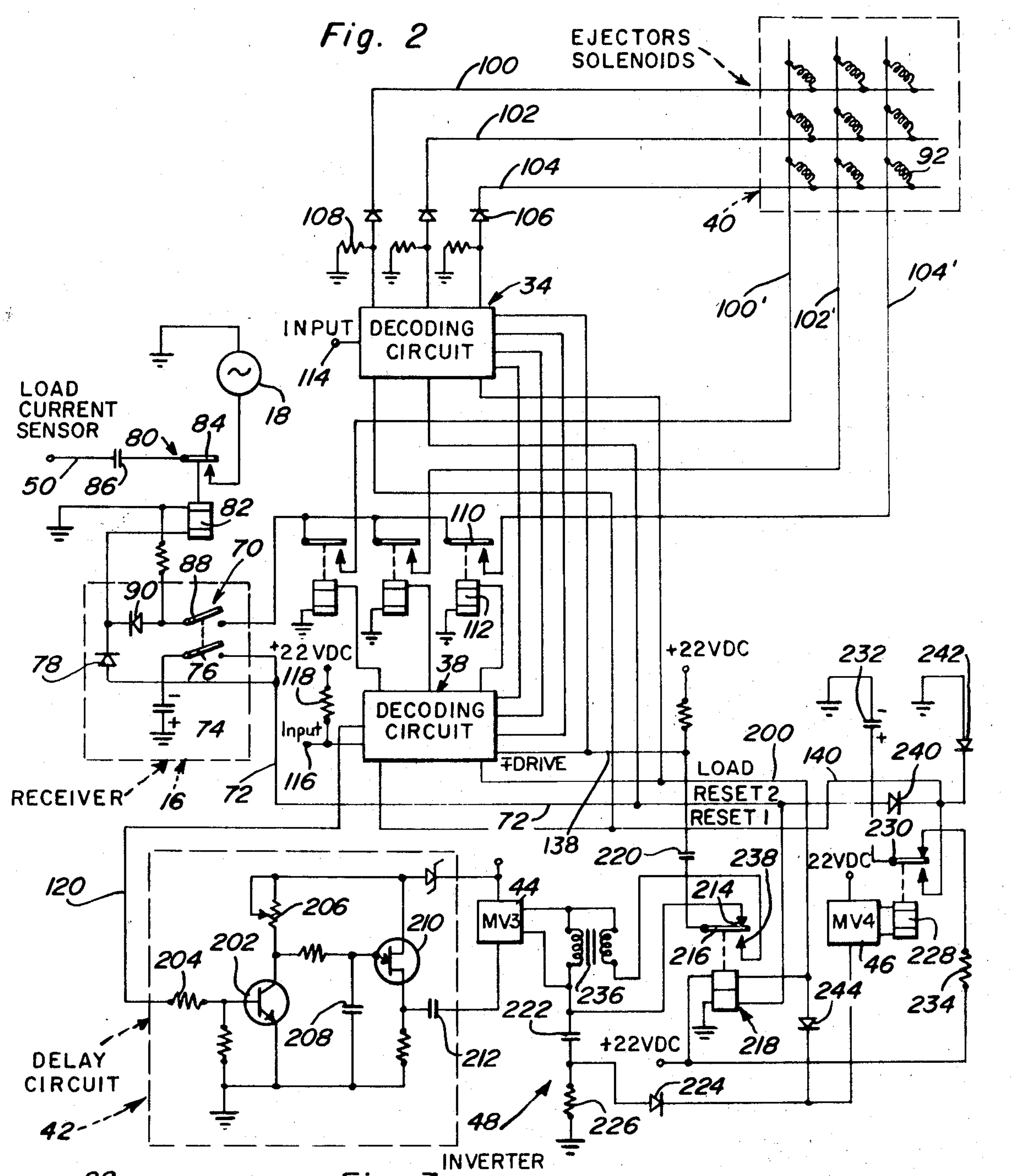
FIG. 2 is an electrical circuit diagram illustrating a portion of the system.

At the beginning of the message reception period when the telephone lines at the receiving station are connected to the transmitter at the reporting station, a switch 70 as shown in FIG. 2, associated with the receiver 16, is closed in order to insure that the apparatus has been reset from a previous operational cycle by connecting the reset line 72 to capacitor 74 through switch section 76 causing it to discharge through reset line 72 to conduct a reset pulse through the diode 78 and load-sensing relay coil 82 of a load current sensor 80 to momentarily close its associated relay switch 84. The output of oscillator 18 is thereby operative to generate a signal pulse transmitted by the signal-coupling capacitor 86 to the telephone lines in order to signal the transmitter at the reporting station that a message cycle has begun. Also, upon closing of the switch 70, the switch section 88 connects the load-sensing relay coil 82 through diode 90 to the energizing circuit for a subsequently selected ejector solenoid to not only complete its energizing circuit but to also sense the solenoid-energizing pulse representing readout of the decoded signal. Thus, at the end of the message cycle, the load current sensor 80 is operative to feed a return signal from the oscillator 18 to the telephone lines thereby signalling the transmitter at the reporting station to stop recycling.

Figure 7:
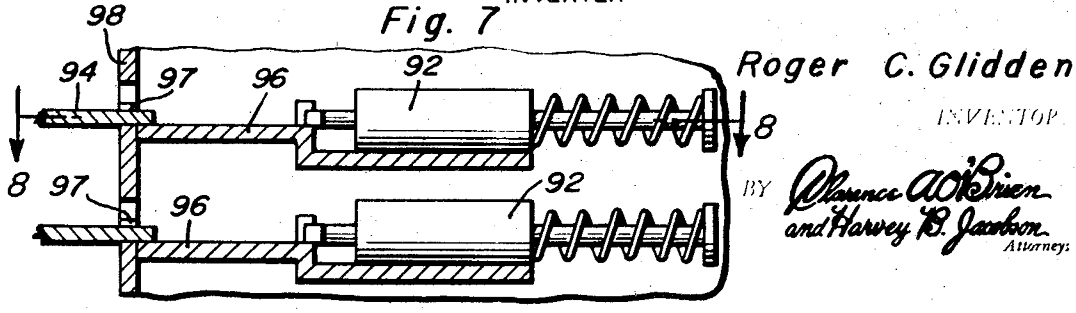
FIG. 7 is a partial sectional view showing a typical card ejector mechanism.

It will be noted from FIG. 2, that the array of solenoid ejectors 40 include a plurality of solenoid coils 92 each of which is operative when pulsed to eject a filecard 94 as illustrated by way of example in FIGS. 7 and 8. Thus, when a selected solenoid ejector is pulsed, a corresponding card is struck by the solenoid plunger and is displaced outwardly through a slot in cabinet 98 until its lateral projections 95 engage the stops 97 on the guide tray 96. Thus, the card will be presented to view and may be temporarily removed by personnel from the cabinet 98. The card will contain information regarding the location of the reporting station from which the code signal originates. The card may then be returned and pushed into its retracted position. Thus, readout of the apparatus does not involve the use of any recording media and does not therefore require any replacement of material nor printing mechanism which requires maintenance as well as considerably more power consumption.

It will be appreciated that any number of solenoid coils may be employed in accordance with the present invention dependent upon the number of reporting stations with which the receiving apparatus is associated. In the example illustrated, nine solenoid coils are shown and accordingly three output lines extend from each decoding circuit including output lines 100, 102 and 104 from the decoding circuit 34 to which the solenoid coils 92 are connected. Three corresponding output lines 100′, 102′ and 104′ extend from the other decoding circuit 38 to the solenoid coils 92 as part of the respective energizing circuits for the solenoids. Each of the decoding circuits will accordingly select one of the output lines at the end of an initial signal transmission interval through which an energizing pulse of electrical energy is conducted at the end of a second signal transmission interval in order to operate the selected solenoid. The output lines associated with the decoding circuit 34 are connected to the output terminals thereof through diodes 106 as shown in FIG. 2 shunted to ground through resistors 108, in order to conduct a positive energizing pulse through the selected solenoid upon closing of one of the relay switches 110 engageable with the contacts to which the output lines 100′, 102′ and 104′ are connected. The relay switches 110 are closed in response to energization of corresponding relay coils 112 connected to and loading the output terminals of the decoding circuit 38.

Both decoding circuits are similar in arrangement and operation for selecting one of the output terminals and conducting energizing current thereto in response to a coded input signal twice received during signal transmission intervals of predetermined duration. The input signals are accordingly fed to the input terminals 114 and 116 of the decoding circuits as shown in FIG. 2. The input terminal to the decoding circuit 38 is also connected to a source of bias voltage through bias resistor 118 in order to initiate a timing cycle in the delay circuit 42 connected to the decoding circuit 38 through signal line 120, as will be hereafter explained in detail.

Figure 3:
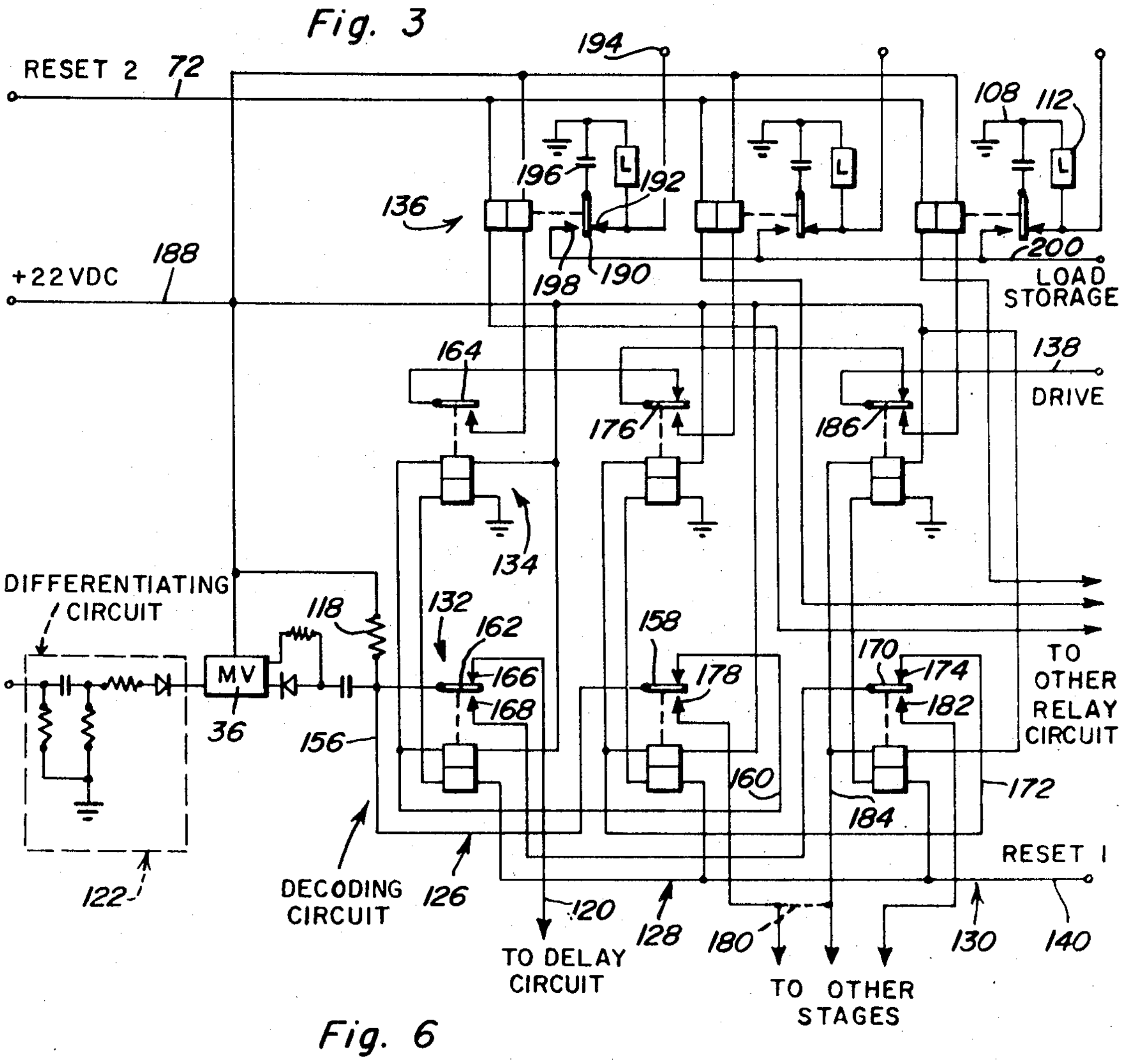
FIG. 3 is an electrical circuit diagram more particularly illustrating the decoding circuit schematically shown in FIG. 2.

FIG. 3 illustrates one of the decoding circuits 38. Inasmuch as both decoding circuits are similar in arrangement and operation, the detailed description thereof to follow will be applicable to both decoding circuits 34 and 38 unless otherwise specified. The input signal which is in the form of pulses, is fed through a differentiating circuit 122 as shown in FIG. 3 so as to develop a corresponding triggering pulse operative to trigger the multivibrator 36 from which a corresponding driving pulse enters an initial stage 126 of the decoding circuit. In the embodiment illustrated, the decoding circuit also includes second and third stages 128 and 130 corresponding to the three output lines associated with each of the decoding circuits as aforementioned. It should however be appreciated that additional stages may be employed depending upon the number of ejector solenoids from which a selection is made. Each stage of the decoding circuit includes a signal-activated relay generally referred to by reference numeral 132, a drive pulse controlling relay 134 and a load-controlling relay 136. In the illustrated form of the invention, each of the relays 132, 134 and 136 in each stage of the decoding circuit is of the latching reed coil type connected to a DC source of 22 volts through voltage line 188 wherein a signal pulse applied to a relay latching terminal displaces a relay switch to a latched position while a reset pulse conducted between a pair of release terminals causes the relay switch to return to its unlatched position. It should however be appreciated that other and equivalent devices may be substituted for the releasable latching relays such as electronic flip-flop devices.

In general, a train of DC pulses when supplied to the initial stage 126 of the decoding circuit, causes an equal number of relays 132 to be sequentially pulsed in succession by the respective pulses in the pulse train so that the relays 132 and 134 in each of the stages are successively latched. The last relay stage to be latched by the incoming signal, will then determine the stage in which a load relay 136 is actuated and latched by a drive pulse supplied to the decoding circuit through a drive pulse line 138 as shown in FIG. 3. The decoding circuit is then reset for reception of the same signal pulse train by a reset pulse applied to the reset terminals of each of the relays 132 and 134 by means of a reset pulse supplied thereto by the reset pulse line 140.

Figure 6:
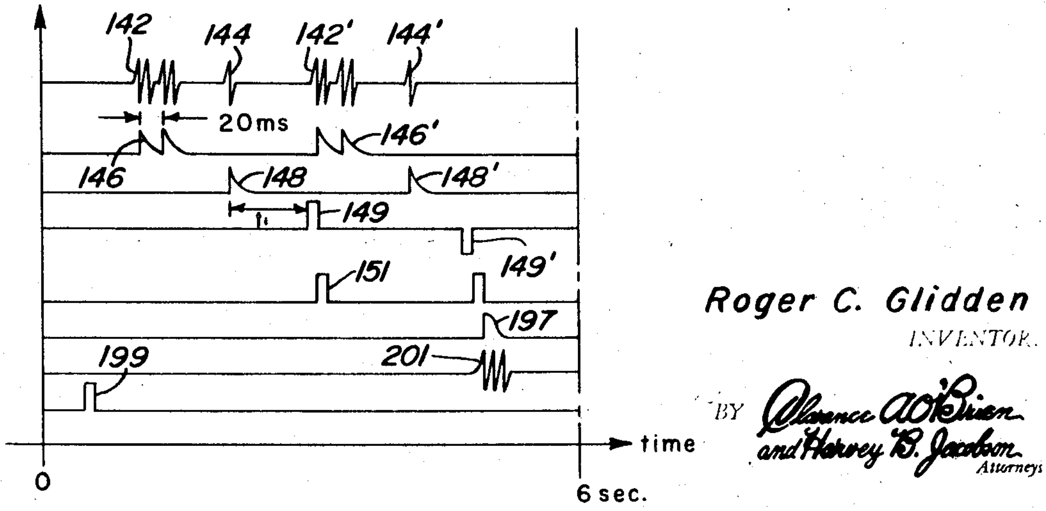
FIG. 6 is a graphical illustration of the signals conducted by the apparatus of the present invention.

FIG. 6 depicts the input signal in the form of two tone bursts 142 at one frequency corresponding to the frequency associated with one signal channel passed by the band-pass amplifier 54 referred to in connection with FIG. 4. A single tone burst 144 at another frequency passed by the band-pass amplifier 56 completes one coded pulse train produced during a predetermined signal transmission interval corresponding to a pulse code of 2, 1. As also shown in FIG. 6, the pulse train consisting of the tone bursts 142 and 144 are repeated as 142′ and 144′ during a second signal transmission interval, both intervals occurring within a message reception period of 6 seconds by way of example. The tone bursts which form the coded pulse train, are converted by the differentiating circuits 122 associated with each of the multivibrators 32 and 36 into triggering pulses 146 and 148 and 146′ and 148′ as shown in FIG. 6. The triggering pulses may be spaced apart in time by 20 milliseconds. The triggering signal pulse 148 fed to the multivibrator 36 will follow pulses 146 fed to the first multivibrator 32. The triggering signal pulses produce driving relay pulses from the multivibrators 32 and 36 which are fed to the relay stages of the decoding circuits. The drive pulse 149 generated at the end of the first signal transmission interval is also depicted in FIG. 6 following a delay of $t_1$ duration after the decoding circuit 38 receives its first input pulse 148. A drive pulse 149′ of reversed polarity at the end of the second signal transmission interval is also shown. Reset pulses 151 immediately follow the drive pulses.

Each of the multivibrators may be of the astable type as shown in FIG. 5 which is stable in one condition under a voltage bias supplied thereto from the power supply during the message reception period and is switched to its astable state by a triggering pulse supplied thereto at the input terminal 150 in order to produce a DC output pulse across the output terminals 152 and 154. This type of multivibrator may be utilized for the multivibrator components 32, 36, 44 and 46. The output driving pulses of each of the multivibrators 32 and 36 as shown for example in FIG. 3, is fed through input line 156 to the relay switch 158 associated with the relay 132 in the second stage 128 of the decoding circuit, all of the relay switches being shown in their quiescent condition with the relay switches unlatched. Thus, the initial pulse received by the decoding circuit is conducted through the relay switch 158 and conductor 160 to the actuating terminals of the relays 132 and 134 in the first stage 126 causing the relay switches 162 and 164 associated therewith to be displaced to the other latched position. When actuated, the relay switch 162 disengages contact 166 and engages contact 168 connected to the relay switch 170 in the third relay stage 130. Thus, if a second drive pulse is received by the decoding circuit, it will be conducted through actuated relay switch 162 and unlatched relay switch 170 to the actuating terminals of the relays 132 and 134 in the second relay stage 128 through conductor 172, to which relay contact 174 is connected. If the relays 132 and 134 in the second stage 128 are actuated, they latch the relay switches 158 and 176 in the other operative positions from that shown so that the input line 156 is then connected through relay switch 158 and contact 178 to the actuating terminals of relays 132 and 134 in the third stage 130 if the jumper 180 is utilized. It will therefore be appreciated, that one, two or three relay stages are actuated dependent upon the number of pulses received during the signal transmission interval. If more than three decoding stages are necessary, the jumper 180 is removed and relay contacts 178 and 180 together with the relay-actuating line 184 are connected to the subsequent stages for sequential actuation thereof.

As each relay stage is actuated, the relays 134 associated therewith are displaced to the other operative positions from that shown in FIG. 3. Thus, when the relay 134 in the first relay stage 126 is actuated, the drive pulse line 138 is connected through the unlatched relay switch 186 in the third relay stage and the unlatched relay switch 176 in the second relay stage to the latched relay switch 164 in the first relay to connect the drive pulse line 138 to one of the actuating terminals of the relay 136 in the same stage. When the relay switch 176 in the second stage is actuated, the circuit from the drive pulse line 138 is transferred to the relay 136 of the second stage and when the relay switch 186 of the third stage is actuated, transfer to the third stage relay 136 occurs. A negative drive pulse is conducted by the drive pulse line 138 following the initial signal transmission interval in order to actuate and latch the selected relay 136 in the last-actuated stage. When the selected relay 136 is latched in, its relay switch 190 is displaced from engagement with contact 192 connected to an output terminal 194 which in the case of the decoding circuit 34 is connected to one of the output lines 100, 102 and 104 through a diode 106 as aforementioned in connection with FIG. 2. In such case, the output terminal 194 is also shunted through a load resistor 108 to ground in parallel with capacitor 196 connected to the relay switch 190. Upon latching of the selected relay 136, the relay switch 190 engages the other contact 198 so as to connect the capacitor 196 to the load storage line 200 through which the capacitor 196 is charged as will be explained hereafter. Thus, the capacitor 196 associated with the selected relay 136 will be charged at the end of the initial signal transmission interval after which a reset pulse 151 is supplied to reset line 140 to unlatch each of the relays 132 and 134 associated with the various stages of the decoding circuit. The reset line 140 is therefore connected in series to the release terminals of the relays 132 and 134 in each of the decoding circuit stages. When each of the relays 132 and 134 is released, the decoding circuit is in condition to receive the second repeated signal pulse train. At the end of the second signal transmission interval, the drive pulse supplied to the drive line 138 is reversed so that a positive drive pulse is fed to the selected relay 136 causing it to release. When the selected relay 136 is unlatched, its relay switch 190 then connects the previously charged capacitor 196 to the output terminal 194 through relay contact 192. The capacitor 196 will then discharge in order to cause the selected ejector solenoid 92 to be pulsed by a load drive pulse 197 as depicted in FIG. 6. In the case of the decoding circuit 34, discharge of the capacitor 196 supplies an energizing pulse through one of the diodes 106 as shown in FIG. 2 to the selected ejector solenoid. The discharge of capacitor 196 in the case of the decoding circuit 38, energizes a corresponding relay coil 112 closing its associated relay switch 110 in order to complete a current path for the discharging capacitor 196 associated with the other decoding circuit 34. This current path extends through the switch 88, diode 90 and load-sensing relay coil 82 of the load current sensor 80 as aforementioned.

It will be observed from FIG. 3, that the reset line 72 is connected to the release terminals of each of the load relays 136 in order to insure that they are unlatched at the beginning of the message reception period by a reset pulse 199 as shown in FIG. 6. The release terminals of the relays 136 in the decoding circuit 34 are connected in series with the release terminals of the relays 136 in the decoding circuit 38 so that the initial reset pulse 199 in reset line 72 will insure unlatching of the relays in both decoding circuits. The reset line 140 and load storage line 200 on the other hand are connected in parallel to both decoding circuits. Thus, the reset lines 72 and 140 as well as the drive pulse line 138 and load storage line 200 control the timing of the signal transmission intervals during which the decoding circuits select the ejector solenoid, reset the decoding circuit for reception of the signal a second time, control the charging of a storage capacitor 196 and discharge thereof to pulse the selected ejector solenoid through the decoding circuits.

The signal transmission interval is determined by means of a timing cycle initiated when the initial stage 126 of the decoding circuit 38 is activated by the first input pulse thereto causing the relay switch 162 to remove the bias voltage applied through resistor 118, contact 166 and signal line 120 from the base of an NPN-type transistor 202 to which the signal line 120 is connected by the resistor 204 in the delay circuit 42 as shown in FIG. 2. The transistor 202 which is initially held in a conductive state under a voltage regulated by the adjustable load resistor 206, will permit the capacitor 208 to charge when it is switched to a nonconductive state upon removal of its base bias. After a predetermined interval, the capacitor 208 charges to a value sufficient to fire the unijunction transistor 210 so as to supply a triggering pulse through signal coupling capacitor 212 to the multivibrator 44. The output drive pulse 149 of the multivibrator 44 is conducted to the contact 214 normally engaged by the relay switch 216 associated with the unlatched drive reversing relay 218 which may be of the latching reed coil type as aforementioned in connection with the relays of the decoding circuits. Thus, the output pulse of the multivibrator 44 is operative through the capacitor 220 to produce a negative voltage pulse in the drive pulse line 138 to which the capacitor 220 is connected. The output of multivibrator 44 is also connected through capacitor 222 and diode 224 to the input of the multivibrator 46. The juncture between the capacitor 222 and diode 224 is connected to ground through a bleed resistor 226. Accordingly, at the end of the output pulse of multivibrator 44, a triggering pulse is fed to the multivibrator 46 from which relay coil 228 is energized. Upon energization of the relay coil 228, its relay switch 230 transfers the charge from capacitor 232 to the reset line 140. Prior to energization of the relay coil 228, its relay switch 230 connects the capacitor 232 to a source of DC voltage through charging resistor 234. Accordingly, the positive reset pulse 151 for resetting the decoding circuits in order to receive the second code pulse train, is derived from the telephone source of voltage stored in capacitor 232 during each signal transmission interval terminated by the reset pulse.

At the end of the first signal transmission interval, the load line 200 is connected to capacitors 196 in the decoding circuits for charging the same through the actuating terminals of the reversing relay 218 so as to cause latching thereof at the same time.

Therefore, following the second signal transmission interval, the relay switch 216 associated with the latched relay 218 can no longer deliver the output pulse from the multivibrator 44 through contact 214 to the capacitor 220 from which the negative drive pulse was previously obtained. Instead, the output pulse of the multivibrator 44 is inverted by the transformer 236 to supply a pulse 149' of opposite polarity to the capacitor 220 through the relay contact 238 with which the relay switch 216 is engaged. A positive drive pulse is then supplied to the drive line 138 for unlatching the selected relay 136 in the decoding circuits as aforementioned, disconnecting the load line 200 from the associated capacitors 196 which were previously charged. When the selected solenoid is then pulsed, momentary energization of the load-sensing relay coil 82 transmits the return signal 201 as depicted in FIG. 6 signifying successful signal reception. The message reception period is then terminated by opening of the switch 70 and disconnection of the power supply from the various components. The drive pulse reversing relay 218 is unlatched at the beginning of the next operational cycle when the switch 70 is closed to supply a current pulse from the charged capacitor 74 through switch section 76 and reset line 72 to its release terminal. It will be noted from FIG. 2, that the reset line 72 is also connected to the reset line 140 through diode 240 so if there are any other relays in a latched condition, they will be unlatched at the beginning of an operational cycle. The juncture between the reset lines 140 and 72 is separated from ground by the diode 242 to suppress arcing of the contacts associated with the relay switch 230. A diode 244 also connects the load storage line 200 to the trigger input for the multivibrator 46 in order to control triggering of the multivibrator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A decoding and readout device for receiving a coded pulse train repeated at least twice during a predetermined signal reception period, comprising at least two signal channels through which signal pulses are conducted, and a plurality of signal readout devices interconnected with said signal channels, said signal channels including decoding means for selecting one of said readout devices in response to reception of said coded pulse train during a first signal transmission interval, energizing means charged by the decoding means during said first interval and means discharging the energizing means in response to repetition of said coded pulse train during a second signal transmission interval within said signal reception period for operating the selected one of the readout devices.

2. A decoding and readout device for receiving a coded pulse train repeated at least twice during a predetermined signal reception period, comprising at least two signal channels through which signal pulses are conducted, and a plurality of signal readout devices interconnected with said signal channels, said signal channels including decoding means for selecting one of said readout devices in response to reception of said coded pulse train during a first signal transmission interval, energizing means for operating the selected one of the readout devices in response to repetition of said coded pulse train during a second signal transmission interval within said signal reception period, delay means connected to one of the signal channels for developing a drive pulse after each of said signal transmission intervals applied to the decoding means in each of the signal channels, means connected to the delay means for resetting the signal channels following completion of the initial and repeated pulse trains, and means responsive to said selection of the readout device for reversing the drive pulse developed by the delay means following reception of the initial pulse train to condition the energizing means for operation.

3. The combination of claim 2 including current-responsive means connected to the energizing means for sensing operation of the selected readout device, and signal-generating means rendered operative by the current-responsive means for indicating successful reception of the repeated coded pulse train.

4. In combination with the device of claim 3, telephone lines connected to the signal channels which further include bandpass amplifiers through which signals of different frequencies are respectively conducted, said coded pulse train being composed of signal portions transmitted at said different frequencies.

5. The combination of claim 4 wherein said decoding means in each of the signal channels includes a plurality of relay stages sequentially operated by successive pulses of the coded pulse train and released by the resetting means following completion of pulse train reception, and a plurality of load relays successively rendered operative and released by corresponding relay stages in response to development of said drive pulses.

6. The combination of claim 5 wherein said energizing means includes energy storage means connected to the selecting means in each of the signal channels, and energizing circuit means rendered operative by the selecting means to alternately charge the energy storage means and discharge the same through the selected readout device.

7. The combination of claim 2 wherein said energizing means includes energy storage means connected to the selecting means in each of the signal channels, and energizing circuit means rendered operative by the selecting means to alternately charge the energy storage means and discharge the same through the selected readout device.

8. The combination of claim 7 wherein said decoding means in each of the signal channels includes a plurality of relay stages sequentially operated by successive pulses of the coded pulse train and released by the resetting means following completion of pulse train reception, and a plurality of load relays successively rendered operative and released by corresponding relay stages in response to development of said drive pulses.

9. The combination of claim 2 wherein said decoding means in each of the signal channels includes a plurality of relay stages sequentially operated by successive pulses of the coded pulse train and released by the resetting means following completion of pulse train reception, and a plurality of load relays successively rendered operative and released by corresponding relay stages in response to development of said drive pulses.

10. In combination with the device of claim 1, telephone lines connected to the signal channels which further include band-pass amplifiers through which signals of different frequencies are respectively conducted, said coded pulse train being composed of signal portions transmitted at said different frequencies.

11. The combination of claim 10 including current-responsive means connected to the energizing means for sensing operation of the selected readout device, and signal-generating means rendered operative by the current-responsive means for indicating successful reception of the repeated coded pulse train.

12. The combination of claim 1 including current-responsive means connected to the energizing means for sensing operation of the selected readout device, and signal-generating means rendered operative by the current-responsive means for indicating successful reception of the repeated coded pulse train.

13. The combination of claim 1 wherein said decoding means in each of the signal channels includes a plurality of relay stages sequentially operating by successive pulses of the coded pulse train and released by the resetting means following completion of pulse train reception, and a plurality of a load relays successively rendered operative and released by corresponding relay stages in response to development of said drive pulses.

14. The combination of claim 1 wherein said energizing means includes energy storage means connected to the selecting means in each of the signal channels, and energizing circuit means rendered operative by the selecting means to alternately charge the energy storage means and discharge the same through the selected readout device.

15. In combination with a communication system having message lines across which a predetermined voltage is established when connected to a receiving station, means for decoding a coded pulse train transmitted to the receiving station through the message lines during a signal period of limited duration comprising a plurality of solenoid-operated devices, means responsive to initial reception of said coded pulse train for selecting one of the solenoid-operated devices, and means connected to the message lines for storing energy and discharging the same through the selected one of the solenoid-operated devices in response to reception of the coded pulse train during said signal period repeated at least two times.

16. The combination of claim 15 including means responsive to energization of the selected one of the solenoid-operated devices for generating a return signal transmitted to the message lines for indicating successful reception of the coded pulse train.

* * * * *